United States Patent Office 2,726,036
Patented Dec. 6, 1955

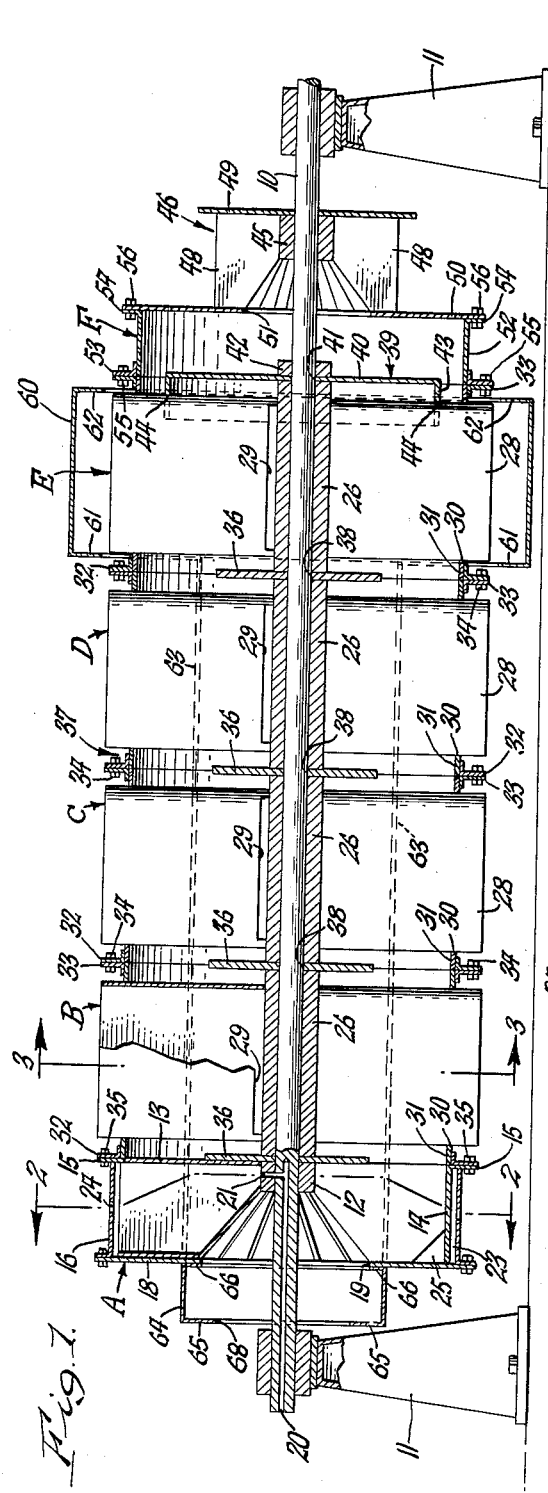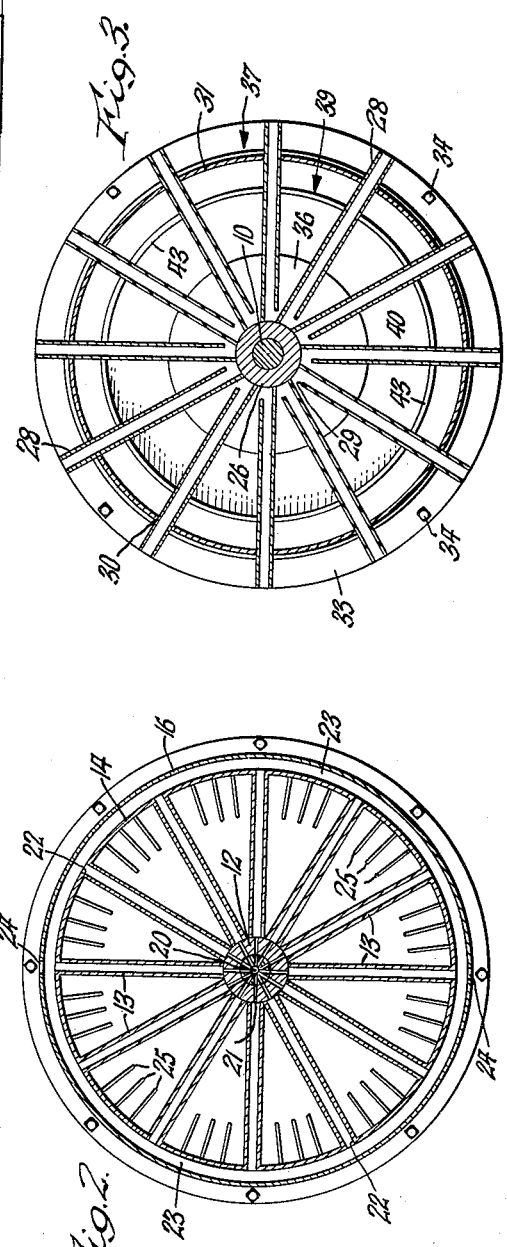

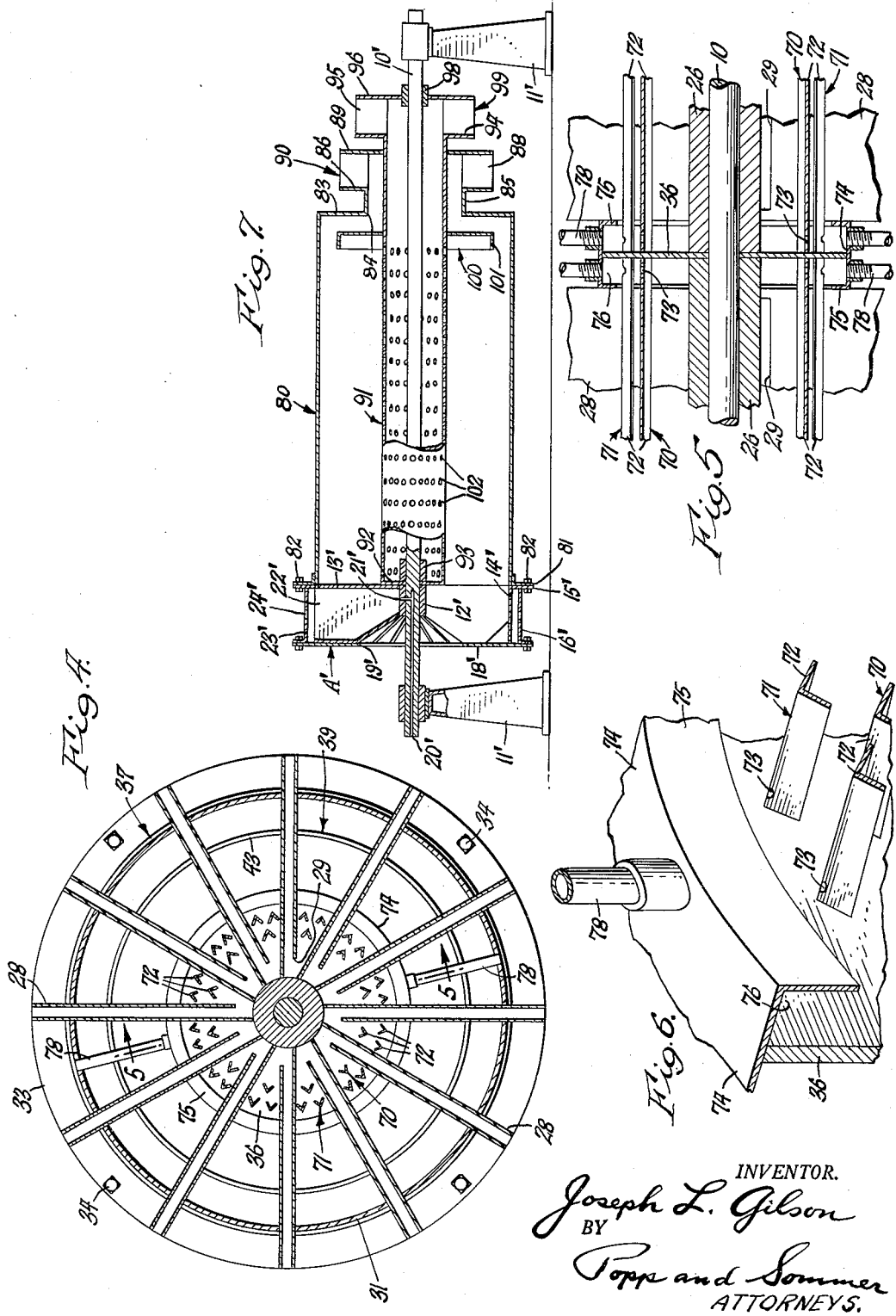

2,726,036

METHOD AND APPARATUS FOR THE MECHANICAL RECTIFICATION OF MIXED GASES

Joseph L. Gilson, Hartsdale, N. Y.

Application March 8, 1952, Serial No. 275,606

19 Claims. (Cl. 233—11)

This invention relates to a method and apparatus for the mechanical rectification of mixed gases and more particularly to the commercial separation, as a continuous process, of large volumes of mixed gases in a flowing stream. The invention is particularly directed to the dehydration of air by the mechanical separation of water vapor therefrom and the invention will be particularly described in conjunction with the dehydration of such large volumes as are required to maintain an atmosphere with a low moisture content to suit a particular manufacturing process or the well being of the workers or occupants of an enclosure.

Large volumes of dehydrated air for industrial use and to provide a more healthful atmosphere for the occupants of enclosures is now provided commercially by three general methods. One is by refrigeration where the temperature of a stream of air is reduced below its dewpoint to condense a corresponding amount of the moisture which is then removed from the air stream as a liquid. This method requires elaborate and expensive apparatus as well as the use of large quantities of air or other cooling medium to provide the low temperature of the coolant used in heat exchange relation with the air stream. Another method is by adsorption wherein the stream of air is passed in intimate contact with a solid hygroscopic substance and by continuously or periodically reactivating the substance by driving the water therefrom so that it can be used over and over again. This method also requires elaborate and expensive apparatus as well as the use of large quantities of heat and air to reactivate the substance. The third method is by absorption wherein the stream of air is passed in intimate contact with a liquid hygroscopic substance and by continuously or periodically reactivating the liquid substance by driving out the water so that it can be reused. This method again requires elaborate and expensive apparatus as well as the use of large quantities of heat, preferably also with large quantities of air, to reactivate the substance.

It has heretofore been proposed to separate gases of different molecular weight mechanically and also to separate water vapor from air by centrifugal force, advantage being taken of the fact that the molecular weight of water vapor is approximately 60% of the weight of oxygen and nitrogen which have approximately equal molecular weights. While the prior art teaches that a volume of air containing water vapor, which under static conditions has the partial pressures equally distributed, can be so disturbed by centrifugal force as to give a higher vapor pressure at the axis than at the perimeter although the total pressure at the perimeter is greater than the total pressure at the axis, these prior devices are not useful for the commercial separation of large volumes of mixed gases in competition with present refrigeration, adsorptive or absorptive systems because they require high total peripheral pressure and hence ultra high speeds to effect removal of the vapor as condensed moisture or as saturated air from the axis zone of the centrifuge. The cost of machinery, as well as the operating cost, of centrifugally separating water vapor from air in accordance with the prior art, especially with the large volumes of air required for normal manufacturing or comfort conditioning, would not compare at all favorably with present commercial processes as outlined above.

It is accordingly one of the principal objects of the invention to separate gases of different molecular weights, particularly water vapor from air, by means of a centrifuge of small size and driven at a relatively slow speed so that the present invention can be practiced with greater economy in equipment, power cost and cost of materials used than with present commercial practices, particularly in drying air. A feature of the invention in accomplishing this object is that a large part of the air handled, over half, is used as scavenging air to carry off the moisture. Another feature is that this scavenging air is discharged so as to create a subnormal pressure toward the core of the rotating body of air thereby to induce an air movement from the periphery toward the core of the rotating body of air. A further feature in accomplishing this objective is that this scavenging and establishing of a subnormal pressure in the core of the rotating body of air is effected at progressive stages along the axis of the rotating body of air although the stages can be infinite. By this means, as the air moves axially along the rotating body, its peripheral part becomes dryer and dryer and the vapor is being progressively abstracted in stages.

Another object is to provide such a centrifuge which is extremely simple and low in cost.

Another aim is to provide such a centrifuge which has no moving parts other than the body of the centrifuge itself, and can also be constructed so as to be free from any adjustable parts, such as adjustable valves, shutters, baffles and the like.

Another object is to provide such a method and apparatus in which any desired degree of rectification of one component gas can be achieved and, when used to dehydrate air, to produce substantially bone dry air, although for most industrial uses or uses for the health and comfort of individuals, only a partial reduction of the moisture content of the air is either necessary or desirable.

Another object of the invention is to provide such a centrifuge which is composed of an axial series of identical units so that with the same parts centrifuges having different capacities of rectification can be constructed, the sections of the centrifuges, to this end, also being readily mounted in tandem.

Another object is to provide such a method and apparatus which will handle condensate in the event the inlet air is close to saturation and condensation takes place.

Another aim is to provide such a centrifuge which is extremely compact so as to occupy far less space than conventional dehydrating equipment of equal capacity and also is more readily adapted to inclusion in standard air handling equipment.

Other objects and advantages of the invention will be apparent from the following description and drawings in which:

Fig. 1 is a vertical longitudinal section, partly in elevation, of apparatus embodying and adapted to carry out the present invention.

Figs. 2 and 3 are slightly enlarged vertical transverse sections taken on the correspondingly numbered lines of Fig. 1.

Fig. 4 is a further enlarged view similar to Fig. 3 and showing a modification of the invention in which provision is made for collecting and discharging any condensate formed in the initial sections of the centrifuge.

Fig. 5 is an enlarged fragmentary longitudinal section taken generally on line 5—5, Fig. 4.

Fig. 6 is a perspective view of the modified form of the invention shown in Figs. 4 and 5 and showing the manner in which the condensate collecting troughs and discharge tubes are connected with one of the internal circular baffles of the centrifuge.

Fig. 7 is a diminutive view similar to Fig. 1 and showing another modified form of the invention.

The invention is preferably practiced with the form of centrifuge illustrated in Figs. 1—3. As there shown, the centrifuge includes a horizontal shaft 10 shown as suitably mounted at its ends in bearing stands 11 and as carrying a plurality of sections of the centrifuge, the letter A representing the inlet section; the letters B, C, D and E representing identical working sections in which the separation of the moisture from the air is progressively effected and the section F representing the outlet or discharge section for the dehydrated air.

The section A includes a hub 12 which is fast to the shaft 10 and has fixed thereto a plurality of hollow fan vanes or blades 13. These blades radiate from the hub and are shown as being in the form of double walled flat plates, each extending parallel with the axis of the shaft 10. The outer ends of these vanes or blades are fixed to the interior face of a cylindrical casing or shell 14. This shell is shown as having at one end an outwardly projecting peripheral flange 15 against which is secured, as by welding, the corresponding edge of a cylindrical jacket 16. The opposite ends of the shell 14 and jacket 16 terminate in a common plane and are shown as secured, as by welding, to an annular front plate or end head 18 to which the corresponding vertical edges of the fan blades 13 can also be secured and which has a central opening 19 which permits entrance of air to the center of the fan formed by the blades 13 and cylindrical shell 14.

It is desirable to remove the heat of compression resulting from the action of the fan blades 13 in compressing the air by driving it centrifugally outwardly against the cylindrical shell or casing 14 and to this end the shaft 10 is shown as provided with an axial bore 20 extending inwardly from its end adjacent the section A to a point in line with the blades 13. At this point the shaft 10 is provided with a plurality of radial bores 21 extending from the axial bore 20 and each communicating with the interior of a corresponding hollow fan blade 13. The outer end of each of these hollow fan blades communicates, as indicated at 22, with the jacket space 23 provided by the cylindrical shell 14, the cylindrical jacket 16, the end flange 15 and the annular end head or plate 18. The cooling water is introduced into the bore 20 and passes through the bores 21 and hollow fan blades 13 into the jacket space 23. The cooling water can be relieved from this jacket space in any suitable manner, as through openings 24 in the jacket 16. The water slung from these openings 24 can be collected in any suitable manner (not shown).

Further to increase the rate of heat transfer between the air heated by reason of its compression by the fan blades 13, the cylindrical shell 14 can be provided with a plurality of inwardly extending fins 25. These fins are shown as being in the form of triangular plates arranged parallel with the axis of the shaft 10 and as having one horizontal edge secured to the interior of the cylindrical shell 14 and another perpendicular edge secured to the inner face of the end head or plate 18.

As previously indicated the working sections B, C, D and E, in which the separation of the moisture from the air takes place, are identical in construction and hence a description of one will be deemed to apply to all. Each of these sections comprises a hub 26 which is fast to the shaft 10. Fast to the hub 26 are a plurality of equally spaced hollow arms or spokes 28. Each of these spokes or arms is preferably in the form of a double walled plate of rectangular outline arranged parallel with the axis of the shaft 10. Adjacent the hub 26 each of these spokes or plates is provided with an air metering slot 29 preferably extending substantially the full length of this spoke or arm and permitting the passage of air surrounding these spokes or arms to the interior of these spokes or arms.

Each of the spokes or arms 28 of each of the working sections extend through an axial slot 30 provided in a cylindrical shell 31. This cylindrical shell is shown as having outwardly extending end flanges 32 and 33 at its opposite ends. The contacting flanges 32 and 33 of the several working sections B, C, D and E are preferably removably secured together, as by bolts 34, so as to provide a single cylindrical casing 37. The flange 32 of the section B is preferably removably secured, as by bolts 35, to the flange 15 of the cylindrical shell 14 of the section A.

A particular feature of the invention resides in the provision of circular baffles 36 between each of the sections A, B, C, D and E. Each of these baffles is in the form of a simple circular disk having a central hole 38 fitting around the shaft 10. Each of these disks or circular baffles 36 fits between the hubs 26 of the adjacent sections B, C, D and E with the exception of the circular baffle adjacent the inlet end of the centrifuge which fits between the hub 12 of the section A and the hub 26 of the section B.

The product or dry air discharge section F is shown as including a large bell-shaped circular baffle 39 having a flat circular end wall 40 provided with a central hole 41 by which it is fitted around the shaft 10 and against the hub 26 of the section E. A collar 42 can be provided to hold this end wall 40 of the bell-shaped baffle 39 against this hub. A cylindrical flange 43 projects from the rim of the circular end wall 40 toward the inlet end of the centrifuge. This rim flange 43 can be notched, as indicated at 44, to fit around the spokes or arms 28 of the section E. A feature of the invention is that the bell-shaped baffle 39 is of a substantially greater diameter than the disk-like baffles 36 and that its rim 43 is in closely spaced relation to the cylindrical shell 31 of the section E.

The dry air discharge section F also includes the hub 45 of a discharge fan indicated generally at 46, the radial blades 48 of this fan being secured to a disk 49 arranged adjacent the corresponding bearing stand 11 and the opposite ends of these blades 48 being secured to a disk 50 having a large central opening 51 providing communication with the interior of the centrifuge. A cylindrical shell 52 is provided at its opposite ends with outwardly projecting annular flanges 53 and 54, the flange 53 being secured, as by bolts 55, to the flange 33 of the working section E, and the flange 54 being secured, as by bolts 56, to the rim portion of the disk 50.

In usual operation the air discharged from the arms or spokes 38 of the section E will be dryer than the inlet air which is to be dried. Accordingly to provide additional gain, it is desirable to recycle this air to the inlet opening 19. While any suitable form of stationary or rotating duct could be provided for this purpose, it is shown as comprising a stationary sheet metal ring 60 surrounding the section E and having opposite inwardly projecting flanges 61 and 62 which encompass the ends of the spokes or arms 28 so that the air discharged from these spokes or arms is collected in the ring 60. A horizontal duct 63 is shown as connecting the interior of this ring 60 with a similar but smaller ring 64 arranged immediately in advance of the inlet opening 19, this latter ring also having inwardly projecting end flanges 65 and 66, the end flange 65 forming the air inlet opening 68 for the apparatus and the end flange 66 forming an opening in register with the inlet opening of the centrifuge. It will be seen that while a preponderance of the air admitted to the centrifuge is the air supplied through the inlet opening 68 of the ring 64, a part of this air is recycled air from the working section E.

In the operation of the apparatus as illustrated in

Figs. 1-3, the shaft 10 is rotating, together with the casing or shell 37 mounted thereon, and in consequence the air to be dehumidified is drawn in through the inlet openings 68 and 19 of the ring 64 and end head 18 by the radial blades 13 in the worikng section A of the casing. This air is centrifugally compressed by these rotating blades 13 and desirably the heat of compression is removed by the liquid coolant flowing through these blades, which, as best shown in Fig. 2, are hollow, and by this coolant flowing through the jacket space 23 of the section A. This coolant is supplied from the bores 20 and 21 of the shaft 10 to the inner ends of the hollow blades 13 and this cooling liquid can be relieved through the openings 24 in the jacket 16 of the cylindrical shell 14 of the section A.

The air so compressed by the blades 13 in the section A flows over the adjacent circular baffle 36 into the section B of the rotating shell. A part of this air travels axially along the inside faces of the shells 31 of the several working sections B, C, D and E and escapes past the large circular baffle 39 into the section F of the rotating shell. This part of the air is drawn through the central outlet opening 51 of the end head 50 by the rotating blades 48 and is discharged as the dehumidified product.

In each of the working sections B, C, D and E a part of the air moves radially inwardly toward the axis of rotation of the casing or shell 37, this movement of the air being produced by the hollow spokes or arms 28 in each of the sections B, C, D and E and which operate to centrifugally eject air from the core of air within the rotating cylinder or casing 37. The amount of air so ejected by these hollow spokes or arms 28 is determined by the metering slots 29 at the inner ends of these hollow spokes 28 and this radial movement and discharge of air from each of these working sections B, C, D and E is individualized by the baffles 36 which segregate the core of air within each of these working sections from the core of air within the adjacent working sections. In dehumidifying air, the air discharged centrifugally by the hollow spokes 28 of each of the working sections B, C, and D is the scavenging air which is wasted to obtain a high degree of dehumidification of the product with a minimum pressure differential established between the outer high pressure zone of the air within the rotating casing or shell 31 and the inner low pressure zone or core of air therein. In establishing this differential, the air pressure within the rotating casing or shell 37 exists on a graduated scale with a relatively high pressure at the inner surface of the rotating shell 37 or perimeter of the body of air therein and diminishing toward the axis of the rotating shell. On the other hand, while the vapor pressure also exists on a graduated scale, the vapor pressure is least at the perimeter of the body of air and highest at the axis of this body and gradually increases from the perimeter to the axis. This inverse relation between the pressures of the air being treated and the vapor pressures are an important feature of the invention and shall hereafter be referred to as inversion of vapor pressure.

The air discharged centrifugally by the spokes 28 of the section E can also be wasted but normally this air, having a high degree of dryness, can advantageously be recycled to the inlet 19. This recycling is through the ring-shaped, stationary hood 60 surrounding the open ends of the arms or spokes 28 of the working section E and through the duct 63 to the ring-shaped, stationary, open end hood 64 arranged in register with the inlet opening 19.

It will be noted that while it is necessary to subject the air to be treated to substantial pressures, having done this it is only necessary to deliver the air to the apparatus at a pressure slightly above atmospheric pressure. Thus after the pressure differential between the air at the perimeter and core of the rotating shell is established, no air is moved, no work is done, and the power to rotate the shell is practically the same as if the shell contained no air at all. The air at the perimeter of the rotating body is trapped in the outer or perimetral zone defined by the end heads 18 and 50. Air under a pressure of two inches of water or less can then be blown in through the inlet opening 19 and withdrawn through the outlet opening 51 without increasing the power required to rotate the shell.

Because of the blades 13, the incoming air is forced to pass through the outer zone of trapped high pressure air, but the pressurizing of this incoming air requires only a slightly higher than atmospheric feed pressure. This situation is analogous to a tube for liquid with upstanding legs where liquid supplied to one leg will pass through a high pressure zone, determined by the weight and head of the liquid, before passing out through the other leg but where the only propelling force required is that necessary to overcome the frictional resistance of the tube.

Since the highest vapor pressure exists at the core or low pressure zone of the body of air in the rotating casing 37, the concentration of moisture at this low pressure zone is highest and this relatively moist air is removed by the introduction of an excess of air in a quantity at least as large as the dried or product air to scavenge or carry away the moist air so concentrating in the core of the rotating body of air. A further important feature is that this scavenging of the moist air at the core of the rotating body of air is effected progressively along the axis so that a part of this scavenging takes place in working section B, another part in working section C and the remaining parts in working sections D and E of the rotating shell or casing 37. It will be noted that this removal is through suction created by the centrifugal force developed in the spokes or arms 28. It will further be noted that the circular baffles 36 segregate the core air of the several working sections B, C, D and E so that the withdrawal of moist core air from each of these working sections is independent of the withdrawal of moist core air from adjacent working sections.

Since the air in working section B is divested of a part of its moisture by the withdrawal of the relatively moist air at its core through the metering slots 29 and radial spokes or arms 28 of working section B, the air passing over the circular baffle 36 between working sections B and C will be dryer than the air entering the inlet opening 19. Since moist air is withdrawn and centrifugally ejected from the low pressure core area of each of working sections C, D and E, the air leaving working section C will be dryer than the air entering working section C; the air leaving working section D will be dryer than the air entering working section D; and the product air leaving working section E will be dryer than the air entering this working section. It will accordingly be seen that the air traveling axially through the rotating shell 37 is progressively reduced in its moisture content and that the air passing over the flanged baffle 40 is materially dryer than the entering air.

As illustrating the importance of introducing an excess of air and utilizing this excess as scavenging air to expel the moist air developed by the higher relative vapor pressure existing at the core of the rotating body of air in the shell 37, let it be assumed that two cubic feet $a$ and $b$ of air having a dry bulb temperature of 95° F. and a wet bulb temperature of 78° F. and having the same vapor pressure of 19.4 mm. Hg and each containing 7.97 grains of vapor are introduced into section A, the vapor under such conditions accounting for 1.63% by weight and 2.7% by volume of the two cubic feet of air. Further assume that the cubic foot $a$ of this air occupies the outer or high pressure zone of the body of air in the rotating casing or shell 37 and that the other cubic foot $b$ occupies the low pressure or core zone of this shell. Further assume that the casing or shell 37 is rotated at such speed as to establish a pressure of 2½ inches of water in the cubic foot $b$ in the high pressure zone and a corresponding vacuum in the other cubic foot $a$ so that a pressure differential of 5 inches in water exists between the two cubic feet. Further assuming the two cubic feet to be confined against escape, by Boyle's law, .011 cubic foot of air will move from the cubic foot $a$ of air in the low pressure zone to the cubic foot $b$ of air in the high pressure zone. Vapor pressure is directly proportional to the quantity of vapor present, so that the orignial vapor pressure in $b$ which was 19.4 mm. can be increased theoretically to 27.4 mm. and the vapor pressure in $a$ reduced to 11.4 mm.

Assuming a pressure differential of 5 inches of water and assuming an inversion of vapor pressure of 8.5 mm. Hg (as compared with the above theoretical 16.0 mm. Hg) let us assume that the cubic foot $b$ is wasted. Under such conditions the retained cubic foot $a$, with a vapor pressure of 15.2 mm. Hg and with the heat of compression removed, would have a dry bulb temperature of 95° F., a wet bulb temperature of 74° F., a relative humidity of 36% and 6.2 grains of moisture. The wasted cubic foot $b$ would have a dry bulb temperature of 95° F., a wet bulb temperature of 81° F., a relative humidity of 55.4% and 9.7 grains of moisture.

Assuming that, instead of two cubic feet of air $a$ and $b$, that three cubic feet of air $a$, $b$ and $c$ are treated and that the two cubic feet of air $b$ and $c$ are wasted, there would be a transfer of 2.65 grains of moisture from $a$ to $b$ and $c$ and the retained cubic foot $a$ with a vapor pressure of 13.1 would have a dry bulb temperature of 95° F.; a wet bulb temperature of 69° F.; a relative humidity of 31% and 5.32 grains of moisture. The wasted two cubic feet $b$ and $c$ would have a vapor pressure of 21.5 mm. Hg; a dry bulb temperature of 95° F.; a wet bulb temperature of 79° F.; a 50% relative humidity and 9.3 grains of moisture.

It will be noted that when two cubic feet are wasted the removal of moisture from cubic foot $a$ is about 50% greater than when one cubic foot is wasted (5.32 grains as compared with 6.2 grains of moisture remaining in $a$). This is based, of course, on the assumption that the inverted pressure differential is limited to 8.5 mm. Hg.

Assuming, instead of two or three cubic feet of air, that four cubic feet of air $a$, $b$, $c$ and $d$ are treated in two stages, as in the sections A and B, and that the three cubic feet $b$, $c$ and $d$ are wasted. In the first stage, as in section A, by wasting two cubic feet of air, as shown in the first example, the retained two cubic feet of air will have a dry bulb temperature of 95° F.; a wet bulb temperature of 74° F., a relative humidity of 36% and 6.2 grains of moisture per cubic foot or 12.4 total grains of moisture. In a second stage, and saving only one cubic foot of air as the final product this cubic foot of air can be dehydrated to have a relative humidity of 26% and a moisture content of 4.43 grains.

Six cubic feet of such initial air can, in a first stage, be used, as outlined above, to produce two cubic feet having a dry bulb temperature of 95° F.; a wet bulb temperature of 69° F.; a relative humidity of 31%; and 5.32 grains of moisture per cubic foot. In a second stage to produce one cubic foot of air, this cubic foot can be dehydrated to have a dry bulb temperature of 95° F.; a wet bulb temperature of 67° F.; a 22% relative humidity; and 3.8 grains of moisture. The other cubic foot of air in this second stage can be returned to the inlet of the first stage for an extra gain, as through the return duct 63.

As an example of the economy of the present process as compared with refrigeration and reheating to effect equivalent dehumidification, it will be assumed that it is desired to recover 1000 cubic feet of 95° F. dry bulb and 36% relative humidity air from 2000 cubic feet of 95° F. dry bulb, 45.7% relative humidity air.

By present process:

| | Horsepower |
|---|---|
| Pump 2000 cu. ft. from 0 to 2" water | 1.12 |
| Power to rotate shell | 1.00 |
| | 2.12 |

By refrigeration and reheat:

| | B. t. u. |
|---|---|
| Total ht. 95° D. B., 45.7 R. H | 40.6 |
| Total ht. 64° D. P. saturated | 29. |
| | 11.6 |
| Lbs. per 1000 cu. ft | .75 |
| | 8.70 |

| | Horsepower |
|---|---|
| Equivalent to 4.35 tons or | 4.00 |
| Power for fan, condenser, etc | 1.00 |
| (plus cost of reheat) | 5.00 |

It will be seen that with the practice of the present invention the dehydration of the air can be effected with the expenditure of 2.12 horsepower as compared with 5 horsepower using refrigeration and reheating to accomplish the same result.

By similar calculations, wasting 2000 cubic feet of air to produce 1000 cubic feet of 95° F. dry bulb, 32% relative humidity air from air having 95° F. dry bulb and 45.7% relative humidity, the practice of the present invention would require the expenditure of 2.63 horsepower as compared with 6 horsepower plus the cost of reheating using refrigeration and reheating.

By similar calculations, using 6000 cubic feet of air to produce 1000 cubic feet of 95° F. dry bulb, 22% relative humidity air from air having a 95° F. dry bulb and 45.7% relative humidity, the practice of the present invention would require the expenditure of 4.76 horsepower as compared with 9.5 horsepower plus the cost of reheating using refrigeration and reheating.

In the practical application of the invention, to produce, say 1000 C. F. M. of air having a dry bulb temperature of 95° F. and a relative humidity of 31% from 3000 C. F. M. of air having a similar dry bulb temperature of 95° F. but a much higher relative humidity of 45.7%, the shell diameter of the working sections B, C, D and E would be in the order of 20 inches; the axial shell length of each of these sections would be approximately 1 foot; and the shaft 10 would be rotated at approximately from 1500 to 1700 R. P. M. The inlet and outlet openings 19 and 51 in the end heads or plates 18 and 50 would be approximately 10 inches and the metering slots 29 at the inner ends of the hollow arms or spokes 28 would be such as to throttle the escape of the scavenging air to a total of 2000 C. F. M.

As previously indicated, it is desirable to have the first or compression section A jacketed and to circulate a coolant through this jacket to remove the heat of compression. Thus at 95° F. saturated one cubic foot of air will hold 17.3 grains of moisture and when air is compressed to 5 inches of water the temperature rises 5.5° F. At 100.5° F. one cubic foot of air will hold 20 grains of moisture, a difference of 2.7 grains less a small factor due to the fact that compressed air holds less moisture. This same tendency of heated air to hold more moisture will prevail when the air is partly saturated and will to some extent nullify the movement of the moisture as desired. While only a smaller part of the air handled in the present apparatus reaches the higher pressure and temperature, the removal of the heat of compression is desirable.

Figs. 4, 5 and 6 illustrate a modification which would be of advantage where air close to saturation is being handled. Under such conditions the moisture of the air entering the central low pressure zone of the working section B and possibly the working section C would exceed the saturation point of the air and hence the excess moisture would be condensed out of this air in these central low pressure zones of these working sections. The modified form of the invention shown in Figs. 4, 5 and 6 is designed to catch this condensate which would, of course, be thrown centrifugally outward in these low pressure zones because of the rapid rotation of the air.

To so catch and discharge such condensate two annular series 70 and 71 of axially extending V-shaped troughs 72 can be provided in these sections B and C concentric with the axis thereof, the ends of each of these troughs being secured to and closed by the corresponding circular baffles 36. The troughs of the series 70 are arranged radially inward from and in staggered relation to the troughs of the series 71 so that, in effect, these troughs of the two series overlap and catch any condensate moving outwardly from the inner low pressure zones of sections B and C through centrifugal force. However, all of the troughs are arranged in spaced relation to one another so that air is free to enter the central low pressure zone of the casing or shell and to be ejected centrifugally through the metering slots 29 and hollow spokes or arms 28 as previously described. The condensate caught in each of these troughs 72 can escape through a hole 73 at one end of each of these troughs. Where such troughs are provided in both the working sections B and the working section C the ends of the troughs 72 having the holes 73 are arranged adjacent the circular baffle 36 interposed between these working sections B and C. On the periphery of this circular baffle is secured a ring 74 which is channel shaped in cross section and has inwardly projecting flanges 75 so as to provide a pair of troughs 76 for catching the condensate flung out from the holes 73 of any of the trough members 72. This condensate is held in the troughs 76 by centrifugal force and is ejected, as by tubes 78, connecting this channel ring 74 with the cylindrical shell 37.

It will accordingly be seen that any condensate forming in the low pressure zones of sections B or C by virtue of the high moisture content of the entering air will be caught by the several troughs 72 and thence flung through their holes 73 into the trough 76 of the channel ring 74 to be conducted thence by the radial tubes 78 to the exterior of the device. This condensate can, of course, be collected and conducted away from the apparatus in any suitable manner.

The invention can be practiced with a considerably simplified apparatus, such as is shown in Fig. 7, although the apparatus as shown in Figs. 1–3 is distinctly preferred. In the apparatus shown in Fig. 7 the centrifuge includes a horizontal shaft 10' shown as suitably mounted at its ends in bearing stands 11' and as carrying at one end an inlet section, designated at A', and which generally conforms to the section A of the form of the invention shown in Figs. 1–3.

Thus the section A' includes a hub 12' which is fast to the shaft 10' and has fixed thereto a plurality of hollow fan blades 13'. These blades radiate from the hub and are shown as being in the form of double walled flat blades each extending parallel with the axis of the shaft 10'. The outer ends of these blades are fixed to the interior face of a cylindrical shell 14'. This shell is shown as having at one end an outwardly projecting peripheral flange 15' against which is secured, as by welding, the corresponding edge of a cylindrical jacket 16'. The opposite ends of the shell 14' and jacket 16' terminate in a common plane and are secured, as by welding, to an annular front plate or end head 18' to which the corresponding vertical edges of the fan blades 13' can also be secured and which annular front end head or plate also has an annular central opening 19' which permits entrance of air to the center of the fan formed by the blades 13' and the cylindrical shell 14'.

As with the preferred form of the invention, it is desirable to remove the heat of compression resulting from the action of the fan blades 13' in compressing the air by driving its centrifugally outwardly against the cylindrical shell 14' and to this end the shaft 10' is provided with an axial bore 20' extending inwardly from its end adjacent the section A' to a point in line with the blades 13'. At this point the shaft 10' is provided with a plurality of radial bores 21' extending from the axial bore 20' and each communicating with the interior of a corresponding hollow fan blade 13'. The outer end of each of these hollow fan blades communicates, as indicated at 22', with the jacket space 23' provided by the cylindrical shell 14', the cylindrical jacket 16', the flange 15' and the annular end head plate 18'. The cooling water is introduced into the bore 20' and passes through the bores 21', hollow fan blades 13', and into the jacket space 23'. The cooling water can be relieved from this jacket space in any suitable manner, as through openings 24' in the jacket 16'. The water slung from these openings 24' can be collected in any suitable manner (not shown).

The separate sections B, C, D, E and F of the preferred form of the invention illustrated in Figs. 1–3 are combined into one cylindrical casing 80 in the form of the invention shown in Fig. 7. One end of this cylindrical casing is shown as provided with an outwardly extending annular flange 81 which can be secured, as by bolts 82, to the flange 15' of the shell 14'. The opposite end of the shell 80 is formed to provide an end head or plate 83 having a central circular opening 84 through which the dehydrated air escapes. The end head or plate 83 is continued in the form of a neck 85 which connects with a flat annular plate 86. To this annular plate 86 are secured a plurality of radial vanes 88, the opposite ends of which are secured to an annular flat plate 89. The blades 88 and their annular end plates 86 and 89 form a fan or blower 90 for discharging the dehydrated or product air. This last annular plate 89 is provided with a central opening and is fitted around and secured to a central cylinder 91. This central cylinder 91 extends to the blades 13' within the section A' and is provided with an end wall or head 92 which contacts these blades. This end wall 92 is also fixed to the shaft 10', preferably through a hub 93 on the shaft and to which it is secured.

The opposite end of the inner cylinder 91 is secured to a flat annular plate 94 to which a plurality of radial blades or vanes 95 are secured. The opposite ends of these blades or vanes 95 are secured to a flat annular plate 96 having a hub 98 which is fast to the shaft 10'. The blades 95 and their annular end plates 94, 96 form a fan or blower 99 for discharging the moist waste or scavenging air. Within the shell 80 and adjacent but spaced from its end head 83 the inner cylinder 91 has fast thereto an annular baffle 100, this annular baffle preferably having a rim flange 101 projecting toward the section A' and being in closely spaced relation to the outer shell 80. Between this baffle 100 and the section A' the central cylinder 91 is provided with a plurality of spaced apertures or openings 102.

The operation of the form of the invention shown in Fig. 7 will be apparent from the description of the operation of the preferred form of the invention illustrated in Figs. 1–3. Thus in the operation of the apparatus the shaft 10' is rotating, together with the shell 80 and other parts of the apparatus fixed to the shaft 10' and in consequence the air to be dehumidified is drawn in through the inlet opening 19' of the end head 18' by the radial blades 13' in the section A' of the casing. This air is centrifugally compressed by these rotating blades 13' and desirably the heat of compression is removed by the liquid coolant flowing through these blades, which are hollow, and by this coolant flowing through the jacket space 23'. This coolant is supplied from the bores 20' and 21' of the shaft 10' to the inner ends of the hollow blades 13' and this coolant liquid can be relieved through the openings 24' in the jacket 16' of the cylindrical shell 14' of the section A'.

The air so compressed by the blades 13' in the section A' passes into the shell 80. A part of this air travels axially along the shell 80 and escapes past the large circular baffle 100. This part of the air is drawn through the central outlet opening 84 of the end head 83 and through the neck 85 by the rotating blades 88 of the fan 90 and is discharged as the dehumidified product.

All along the shell 80 a part of the air moves radially inwardly toward the axis of rotation of the shell, this part of the air flowing through the openings 102 of the inner cylinder 91 and this movement of the air being provided by the blades or vanes 95 of the fan 99 which operate to centrifugally eject air from the inner cylinder 91. The amount of air so ejected by these blades 95 is determined by the size, number and disposition of the openings 102 in the inner cylinder 91.

In dehumidifying air, the air discharged centrifugally by the blades or vanes 95 of the fan 99 is the scavenging air which is wasted to obtain a high degree of dehumidification of the product with a minimum pressure differential established between the outer high pressure zone of air within the rotating shell 80 and the inner low pressure zone or core of air surrounding the inner cylinder 91. As with the preferred form of the invention, in establishing this differential, the air pressure within the rotating shell 80 exists on a graduated scale with a relatively high pressure at the inner surface of the rotating shell and diminishing toward the outer surface of the inner cylinder 91. On the other hand, while the vapor pressure also exists on a graduated scale, the vapor pressure is least at the perimeter of the body of air adjacent the inner surface of the outer shell 80 and highest at the outer surface of the inner cylinder 91 and gradually increases from the perimeter toward this outer surface of the inner cylinder 91. Thus, as with the preferred form of the invention, the operation of the apparatus essentially revolves around an inversion of the vapor pressure.

Since the highest vapor pressure exists along the outer surface of the inner cylinder 91, the concentration of moisture at the outer surface of this inner cylinder is highest and this relatively moist air is removed, through the perforations 102, by the introduction of an excess of air in a quantity at least as large as the product air. This scavenging air used to carry away the moist air so concentrating at the outer surface of the inner cylinder 91 is discharged centrifugally by the blades 95 of the fan 99. While in the form of the invention shown in Fig. 7 the apparatus is not sectionalized as in the preferred form of the invention, as the air moves axially along the outer shell 80 it is progressively robbed of its moisture content by the escape of the moist air through the openings 102 into the inner cylinder 91. Accordingly the air traveling along the inner surface of the outer shell 80 progressively becomes drier and drier until finally it escapes as the dry product air past the baffle 100. While the form of the invention shown in Fig. 7 does not have all of the advantages of the preferred form of the invention, this form of the invention illustrates how the invention can be practiced in a simplified structure.

From the foregoing it will be seen that the present invention provides a simple and efficient method and apparatus for the separation of gases, particularly such as water vapor from air, which possesses advantages and economies over present commercial methods of removing moisture from air. It will also be seen that the invention essentially involves the establishment of an inverted vapor pressure relation to the pressure created in a body of air by rotating the same and by utilizing an excessive intake of air to scavenge the moist air. It will further be seen that the invention can be used to obtain the degree of dryness normally commercially required as well as higher degrees of dryness and that the invention achieves the various objects set forth.

I claim:

1. Apparatus for rectifying the component gases of a mixture and which component gases have different molecular weights, which comprises a hollow shell adapted to confine a single body of said mixed gases mounted to rotate about its axis having a tubular body with end heads at its axial ends, said end heads each having a rim portion extending inwardly from said tubular body and arranged to trap against direct centrifugal escape at least the peripheral portion of said single body of mixed gases in said hollow shell and to establish as a function of centrifugal force a high pressure peripheral zone of trapped gases and a low pressure core zone in said body of mixed gases, means arranged to introduce the mixed gases to be separated into one end of said hollow shell to establish an axial flow therethrough, means arranged to remove a portion of the gases from one of said zones at each of a progression of intervals along the axis of said single body of mixed gases, and means arranged to recover the gases from the other of said zones.

2. Apparatus for rectifying the component gases of a mixture and which component gases have different molecular weights, which comprises an axially elongated hollow shell adapted to confine a single body of said mixed gases mounted to rotate about its axis and having a tubular body with end heads at its opposite axial ends each provided with inlet and outlet openings respectively and each of said openings being in spaced relation to the perimeter of the corresponding end head thereby to establish as a function of centrifugal force a trapped portion of said gases in the peripheral portion of said hollow shell to provide a high pressure peripheral zone of mixed gases trapped against direct centrifugal escape and a low pressure core zone, means arranged to introduce said mixed gases to be separated through said inlet opening to flow axially through said hollow shell and out through said outlet opening, means arranged to remove a portion of the gases from one of said zones at each of a progression of intervals along said single body of mixed gases, and means arranged to recover the gases from the other of said zones.

3. Apparatus for rectifying the component gases of a mixture and which component gases have different molecular weights, which comprises a hollow shell adapted to confine a single body of said mixed gases mounted to rotate about its axis and having end heads at its axial ends, said end heads each having a rim portion extending inwardly from said tubular body and arranged to trap against direct centrifugal escape at least the peripheral portion of said single body of mixed gases in said hollow shell and to establish as a function of centrifugal force a high pressure peripheral zone and a low pressure core zone of trapped gases in said body of mixed gases, means arranged to introduce the mixed gases to be separated into one end of said hollow shell to pass through said high pressure zone and to flow axially through single body of mixed gases, a conduit structure within and extending axially along said hollow shell and having at least one discharge opening arranged externally of said hollow shell, said conduit structure being provided with a plurality of openings communicating with said core zone of said single body of mixed gases to remove a portion of the gases from said core zone at each of a progression of intervals along the axis of said single body of mixed gases, and means arranged to recover the gases from said peripheral zone.

4. Apparatus for rectifying the component gases of a mixture and which component gases have different molecular weights, which comprises a hollow body mounted to rotate about its axis and having end heads at its axial ends arranged to trap at least the peripheral portion of the body of mixed gases in said hollow body and to establish as a function of centrifugal force a high pressure peripheral zone and a low pressure core zone in said body of mixed gases, means arranged to introduce the mixed gases to be separated into said hollow body to pass through said high pressure zone and to flow axially through said hollow body, and a conduit structure within and rotating with and extending axially along said hollow body and having at least one radially extending discharge tube terminating in an outlet at the outer end of said tube whereby the outward movement of gases through said discharge passage under centrifugal force creates a suction in said conduit structure, said conduit structure also being provided with a plurality of openings communicating with said core zone of said body of mixed gases to bleed off a portion of the gases from said core zone at each of a progression of intervals along the axis of said hollow body, and means arranged to recover the gases from said peripheral zone.

5. Apparatus for rectifying the component gases of a mixture and which component gases have different molecular weights, which comprises an axially elongated hollow body mounted to rotate about is axis and having end heads at its opposite axial ends provided with inlet and outlet openings respectively and each of said openings being in spaced relation to the perimeter of the corresponding end head thereby to establish as a function of centrifugal force a trapped body of said gases in said hollow body having a high pressure peripehral zone and a low pressure core zone, means arranged to introduce said mixed gases to be separated through said inlet opening to flow axially through said hollow body and out through said outlet opening, and a conduit structure within and rotating with and extending axially along said hollow body and having at least one radially extending discharge tube terminating in an outlet at the outer end of said passage whereby the outward movement of gases through said discharge passage under centrifugal force creates a suction in said conduit structure, said conduit structure also being provided with a plurality of openings communicating with said core zone of said body of mixed gases to remove a portion of the gases from said core zone at each of a progression of intervals along the axis of said hollow body, and means arranged to recover the gases from said peripheral zone.

6. Apparatus for rectifying the component gases of a mixture and which component gases have different molecular weights, which comprises an axially elongated hollow body mounted to rotate about its axis and having end heads at its opposite axial ends provided with inlet and outlet openings respectively and each of said openings being in spaced relation to the perimeter of the corresponding end head thereby to establish as a function of centrifugal force a trapped body of said gases in said hollow body having a high pressure peripheral zone and a low pressure core zone, a plurality of radial vanes arranged in and fixed to said hollow body around said inlet opening to draw mixed gases in through said inlet opening and to force the same through said peripheral zone and toward said outlet opening, means arranged to remove a portion of the gases from one of said zones at each of a progression of intervals along the axis of said hollow body, and means arranged to recover the gases from the other of said zones.

7. Apparatus for rectifying the component gases of a mixture and which component gases have different molecular weights, which comprises an axially elongated hollow body mounted to rotate about its axis and having end heads at its opposite axial ends provided with inlet and outlet openings respectively and each of said openings being in spaced relation to the perimeter of the corresponding end head thereby to establish as a function of centrifugal force a trapped body of said gases in said hollow body having a high pressure peripheral zone and a low pressure core zone, a plurality of radial vanes arranged in and fixed to said hollow body around said inlet opening to draw mixed gases in through said inlet opening and to force the same through said peripheral zone, and toward said outlet opening, means arranged to conduct a cooling medium through said vanes to remove the heat of compression by said vanes of said gases, means arranged to remove a portion of the gases from one of said zones at each of a progression of intervals along the axis of said hollow body, and means arranged to recover the gases from the other of said zones.

8. Apparatus for rectifying the component gases of a mixture and which component gases have different molecular weights, which comprises an axially elongated hollow body mounted to rotate about its axis and having end heads at its opposite axial ends provided with inlet and outlet openings respectively and each of said openings being in spaced relation to the perimeter of the corresponding end head thereby to establish as a function of centrifugal force a trapped body of said gases in said hollow body having a high pressure peripheral zone and a low pressure core zone, means arranged to introduce said mixed gases to be separated through said inlet opening to flow axially through said peripheral zone in said hollow body and out through said outlet opening, a substantially imperforate outlet baffle arranged centrally in said hollow body across said low pressure core zone and a part of said high pressure peripheral zone and having its perimeter in closely spaced relation to the inner face of said hollow body and said outlet baffle being in closely spaced relation to said outlet opening whereby only gases in the outer part of said peripheral zone can escape through said outlet opening, and a conduit structure within and extending axially along said hollow body and having at least one discharge opening arranged externally of said hollow body, said conduit structure being provided with a plurality of openings communicating with said core zone of said body of mixed gases to remove a portion of the gases from said core zone at each of a progression of intervals along the axis of said hollow body.

9. Apparatus for rectifying the component gases of a mixture and which component gases have different molecular weights which comprises a hollow body mounted to rotate about its axis and having end heads at its axial ends arranged to trap at least the peripheral portion of the body of mixed gases in said hollow body and to establish as a function of centrifugal force a high pressure peripheral zone and a low pressure core zone in said body of mixed gases, means arranged to introduce the mixed gases to be separated into one end of said hollow body to pass through said high pressure zone and to flow axially through said hollow body, a series of hollow spokes fast to and spaced axially along said hollow body, each of said hollow spokes having an inlet opening at its inner end in communication with said core zone of said body of mixed gases and having an outlet opening at its outer end arranged externally of said hollow body whereby said spokes centrifugally discharge a portion of the gases from said core zone at each of a progression of intervals along the axis of said hollow body, and means arranged to recover the gases from said peripheral zone.

10. Apparatus for rectifying the component gases of a mixture and which component gases have different molecular weights, which comprises an axially elongated hollow body mounted to rotate about its axis and having end heads at its opposite axial ends provided with inlet and outlet openings respectively and each of said openings being in spaced relation to the perimeter of the corresponding end head thereby to establish as a function of centrifugal force a trapped body of said gases in said hollow body having a high pressure peripheral zone and a low pressure core zone, means arranged to introduce said mixed gases to be separated through said inlet opening to flow axially through said peripheral zone in said hollow body and out through said outlet opening, an outlet baffle in said hollow body having its perimeter in closely spaced relation to the inner face of said hollow body and said outlet baffle being in closely spaced relation to said outlet opening whereby only gases in the outer part of said peripheral zone can escape through said outlet opening, and a series of hollow spokes fast to and spaced axially along said hollow body, each of said hollow spokes having an inlet opening at its inner end in communication with said core zone of said body of mixed gases and having an outlet opening at its outer end arranged externally of said hollow body whereby said spokes centrifugally discharge a portion of the gases from said core zone at each of a progression of intervals along the axis of said hollow body.

11. Apparatus for rectifying the component gases of a mixture and which component gases have different molecular weights, which comprises a hollow body mounted to rotate about its axis and having end heads at its axial ends arranged to trap at least the peripheral portion of the body of mixed gases in said hollow body and to establish as a function of centifugal force a high pressure peripheral zone and a low pressure core zone in said body of mixed gases, means arranged to introduce the mixed gases to be separated into said hollow body to pass through said high pressure zone and to flow axially through said hollow body, a series of flat hollow spokes fast to and spaced axially along said hollow body, the flat faces of said spokes being arranged parallel with said axis, each of said spokes having at its inner end a metering slot in one wall providing communication between the interior of said spoke and the core zone of said body of mixed gases and each of said hollow spokes having an outlet opening at its outer end arranged externally of said hollow body whereby said spokes centrifugally discharge a portion of the gases from said core zone at each of a progression of intervals along the axis of said hollow body, and means arranged to recover the gases from said peripheral zone.

12. Apparatus for rectifying the component gases of a mixture and which component gases have different molecular weights, which comprises a hollow body mounted to rotate about its axis and having end heads at its axial ends arranged to trap at least the peripheral portion of the body of mixed gases in said hollow body and to establish as a function of centrifugal force a high pressure peripheral zone and a low pressure core zone in said body of mixed gases, means arranged to introduce the mixed gases to be separated into said hollow body to establish an axial flow therethrough, means arranged to remove a portion of the gases from one of said zones at each of a progression of intervals along the axis of said hollow body, means arranged to recover the gases from the other of said zones, and a series of transverse baffles arranged centrally within and spaced axially along said hollow body across said low pressure core zone, the perimeter of each of said transverse baffles being spaced from said hollow body and dividing said core zone into a series of individual open compartments arranged axially along said hollow body.

13. Apparatus for rectifying the component gases of a mixture and which component gases have different molecular weights, which comprises a hollow body mounted to rotate about its axis and having end heads at its axial ends arranged to trap at least the peripheral portion of the body of mixed gases in said hollow body and to establish as a function of centrifugal force a high pressure peripheral zone and a low pressure core zone in said body of mixed gases, means arranged to introduce the mixed gases to be separated into said hollow body to pass through said high pressure zone and to flow axially through said hollow body, a series of hollow spokes fast to and spaced axially along said hollow body, each of said hollow spokes having an inlet opening at its inner end in communication with said core zone of said body of mixed gases and having an outlet opening at its outer end arranged externally of said hollow body whereby said spokes centrifugally discharge a portion of the gases from said core zone at each of a progression of intervals along the axis of said hollow body, means arranged to recover the gases from said peripheral zone, and a series of transverse baffles arranged centrally within and spaced axially along said hollow body across said low pressure core zone in alternate relation to said hollow spokes, the perimeter of each of said transverse baffles being spaced from said hollow body and dividing said core zone into a series of individual open compartments arranged axially along said hollow body and each containing at least one of said spokes.

14. Apparatus for rectifying the component gases of a mixture and which component gases have different molecular weights, which comprises a cylindrical inlet section having an end head having an inlet opening in spaced relation to the perimeter of said end head, a plurality of radial vanes fast to said inlet section and arranged on rotating said end head to draw air in through said inlet opening and to compress it against the cylindrical wall of said inlet section, a cylindrical outlet section having an end head having an outlet opening in spaced relation to the perimeter of its end head, a series of open ended cylindrical working sections having their rims arranged in mating relation to each other and having the opposite end rims of said series in mating relation with the rims of said inlet and outlet sections, respectively, to provide a cylindrical body composed of said sections, a drive shaft extending coaxially through each of said sections, an end hub fast to said shaft and fast to said vanes of said inlet section, another end hub fast to the other end of said shaft and fast to said outlet section, intermediate hubs fast to said shaft and each associated with a corresponding working section, a plurality of transverse baffles mounted on said shaft with each of said baffles arranged between opposing ends of said hubs of said working sections, and a series of hollow spokes fast to and radiating from each hub of said working sections and having an open outer end projecting through the cylindrical wall of the corresponding working section, each of said spokes having an inlet opening at its inner end in the space defined by the baffles interposed between the hubs of said working sections.

15. Apparatus as set forth in claim 1 additionally including an annular series of trough members in said hollow shell concentric with and having their concave sides facing said axis and arranged adjacent the outer part of said core zone to catch any condensate developing in said core zone, and means arranged to remove condensate caught by said trough members.

16. Apparatus as set forth in claim 15 wherein said means arranged to remove condensate caught by said trough members comprises a channel ring surrounding said trough members and having an inwardly opening annular concavity arranged in radial alinement with openings through said trough members, and a discharge duct extending radially outwardly from said channel ring and communicating with said annular concavity.

17. Apparatus as set forth in claim 1 wherein said one of said zones is said core zone and said other of said zones is said peripheral zone, wherein said means arranged to remove a portion of the gases from said one of said zones comprises a series of hollow spokes fast to and spaced axially along said hollow shell, each of said hollow spokes having an inlet opening at its inner end in communication with said core zone of said body of mixed gases and having an outlet opening at its outer end arranged externally of said hollow shell whereby said spokes centrifugally discharge a portion of the gases from said core zones at each of a progression of intervals along the axis of said hollow shell, wherein a series of transverse baffles are arranged centrally within and are spaced axially along said hollow shell across said core zone in alternate relation to said hollow spokes, the perimeter of each of said transverse baffles being spaced from said hollow shell and dividing said core zone into a series of individual open compartments arranged axially along said hollow shell and each containing at least one of said spokes, wherein a series of trough members are arranged concentric with and have their concave sides facing said axis to catch any condensate developing in said core zone, and wherein means are arranged to remove condensate caught by said trough members.

18. Apparatus as set forth in claim 1 wherein said one of said zones is said core zone and said other of said zones is said peripheral zone, wherein a perforated hollow internal cylinder is arranged coaxially within the hollow cylindrical shell, the perforations of said internal cylinder extending axially along and being in communication with said low pressure zone to permit of the removal of gases from said core zone at a progression of intervals along said hollow cylindrical shell and wherein means are provided to remove the gases from said perforated internal cylinder.

19. Apparatus as set forth in claim 18 wherein an end of said perforated cylinder projects from the corresponding end of said cylindrical shell, and wherein said means provided to remove the gases from said perforated internal cylinder comprises a blower connected with the projecting end of said perforated internal cylinder and withdrawing the gases therefrom.

References Cited in the file of this patent

UNITED STATES PATENTS

| | | |
|---|---|---|
| 165,785 | Braun | July 20, 1875 |
| 717,963 | Bardolle | Jan. 6, 1903 |
| 1,061,656 | Black | May 13, 1913 |
| 2,422,882 | Bramley | June 24, 1947 |
| 2,459,145 | Boestad | Jan. 18, 1949 |
| 2,551,815 | Schulz | May 8, 1951 |

FOREIGN PATENTS

| | | |
|---|---|---|
| 20,494 | Great Britain | Oct. 12, 1899 |